United States Patent [19]
Blotenberg

[11] Patent Number: 5,960,624
[45] Date of Patent: Oct. 5, 1999

[54] PROCESS FOR REGULATING GAS PRESSURES OF CATALYST REGENERATOR EXPANSION TURBINES

[75] Inventor: Wilfried Blotenberg, Dinslaken, Germany

[73] Assignee: GHH Borsig Turbomaschinen GmbH, Oberhausen, Germany

[21] Appl. No.: 08/881,809

[22] Filed: May 30, 1997

[30] Foreign Application Priority Data

May 31, 1996 [DE] Germany ............................ 196 21 824

[51] Int. Cl.⁶ ....................................................... F02C 9/16
[52] U.S. Cl. ........................................ 60/39.02; 60/39.25
[58] Field of Search .................... 60/39.02, 39.03, 60/39.12, 39.25

[56] References Cited

U.S. PATENT DOCUMENTS

| | | | |
|---|---|---|---|
| 2,384,356 | 9/1945 | Tyson | 60/39.02 |
| 3,247,129 | 4/1966 | Roelfsen et al. | 60/39.182 |
| 3,532,620 | 10/1970 | Asmus et al. | 208/113 |
| 3,855,788 | 12/1974 | Damratowski | 60/39.03 |

Primary Examiner—Louis J. Casaregola
Attorney, Agent, or Firm—McGlew and Tuttle, P.C.

[57] ABSTRACT

A process for regulating gas pressures of a regenerator with a gas expansion turbine in a flue gas line with a generator, wherein a process regulator opens the inlet valves of a gas expansion turbine and/or the bypass valves or throttles the bypass valves, doing so once with operation and once without operation of the gas expansion turbine. The process regulator is followed by a plurality of function generators, which preset the correcting variables for the downstream valves and in which a first function course of the function generators for operation of the gas expansion turbine and a second function course of the function generators for operation without gas expansion turbine are stored. A quick-acting valve of the inlet valves is acted upon by the speed regulator and it is active only at the time of the start-up of the gas expansion turbine until synchronization of the generator.

25 Claims, 1 Drawing Sheet

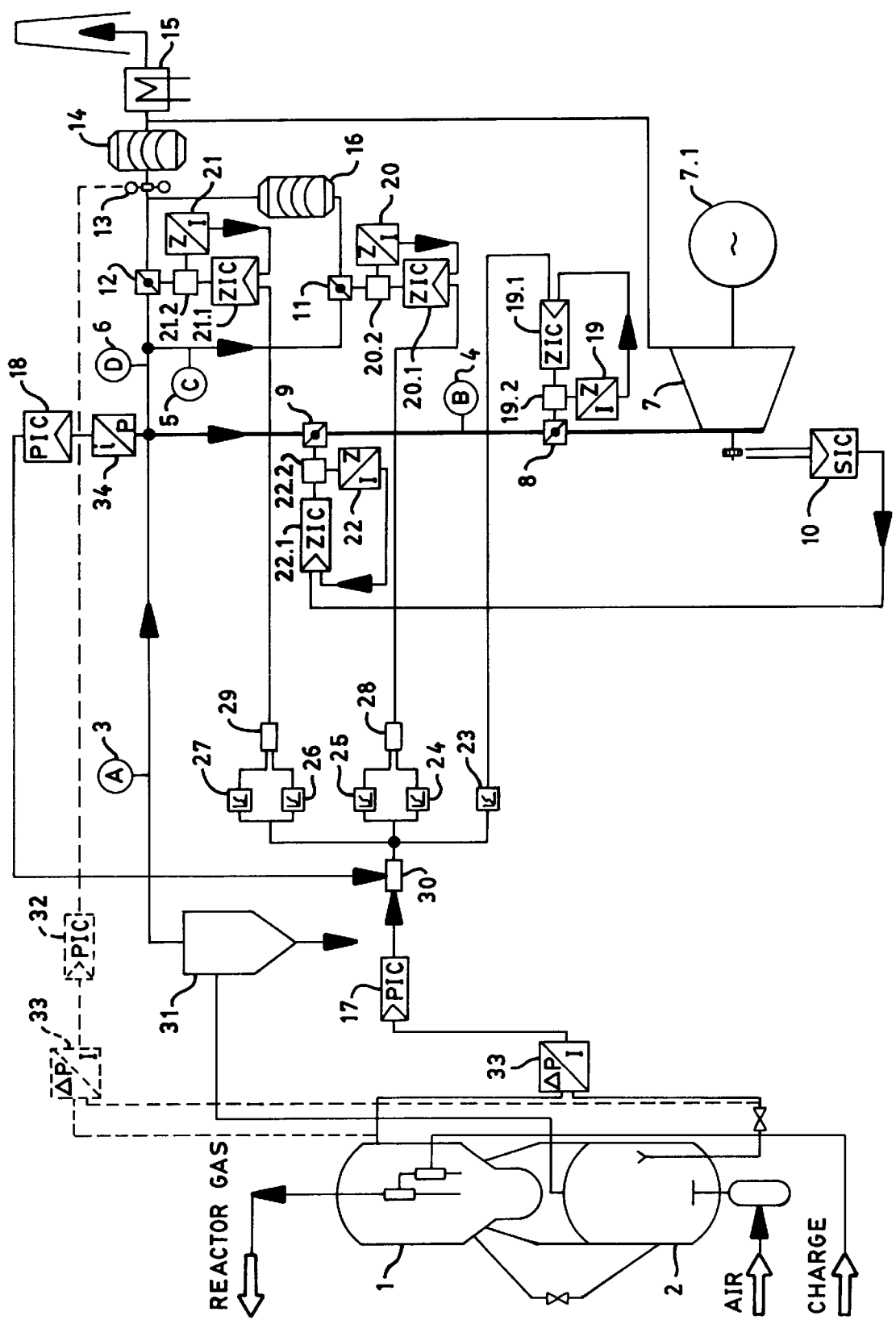

PROCESS FOR REGULATING GAS PRESSURES OF CATALYST REGENERATOR EXPANSION TURBINES

FIELD OF THE INVENTION

The present invention pertains to a process for regulating gas pressures of a regenerator operating interconnected with a reactor, during the use of at least one gas expansion turbine in the waste gas line with a generator or with another load, wherein a process gas pressure regulator opens the inlet valves of a gas expansion turbine and/or the bypass valves or throttles the valves.

BACKGROUND OF THE INVENTION

Energy recovery from waste gases in the chemical or petrochemical industry has been increasingly popular. Process gases, whose energy content is sufficient to supply between 30% and 100% of the compression work (driving power for the necessary compressors) for the chemical process are released from the chemical process in such processes as FCC (Fluid Catalytic Cracking), PTA (Terephthalic Acid Production), in nitric acid production, and other processes.

Gas expansion turbines or expanders are usually used to recover this energy.

Waste gas flows through these gas expansion turbines before it is discharged into the atmosphere. The gas expansion turbines are frequently arranged on a single machine shaft together with compressors for compressing the process gases, so that they can directly drive the compressor.

Gas expansion turbines that drive only an electric generator are also used in other cases of application, especially when an existing plant is to be expanded by an energy recovery unit.

The typical output classes for such gas expansion turbines are 6–20 MW; however, these units are also built for outputs of up to 60 MW.

To maintain the process pressure at a constant value even in the case of variable amounts of waste gas, there are regulating valves at the inlet of the gas expansion turbine. These regulating valves throttle when the amount of waste gas decreases, and they open when the amount of waste gas increases.

In the case of overload, bypass valves arranged in parallel to the gas expansion turbine are able to bypass part of the waste gas past the gas expansion turbine directly into the atmosphere. These bypass valves are together made so large that they are also able to bypass the total amount of waste gas into the atmosphere when the expander is switched off.

Gas expansion turbines or expanders belong in the class of the rotating machines and require an emergency switchoff system. Overspeed is one of the severe incidents that can occur with a gas expansion turbine.

To prevent an overspeed, the inlet valves of the gas expansion turbine must close within 0.6 to 2 sec. This case of overspeed is especially critical in machine constellations, arrangements and configurations in which a gas expansion turbine drives an electric generator only.

Should the generator be suddenly disconnected from the power line, e.g., due to a disturbance in the electric part of the generator, the entire power of the gas expansion turbine is available for accelerating the machine set.

It can be ensured that the increase in speed remains limited to values below 10% of the rated speed only if the gas throughput is completely interrupted after 0.6 sec.

The case of overspeed may also occur in gas expansion turbines which are mounted on one shaft together with compressors. Quick-acting inlet valves are necessary in this case as well. However, the closing time may be prolonged to up to 2 sec in this case.

Energy recovery units are to be designed such that they do not compromise the chemical process. This also applies to an emergency switchoff. Protective and regulating means are to be provided, which shall ensure in the case of an emergency switchoff that the process pressure is not subject to any unacceptable changes.

In the case of gas expansion turbines, this means that the bypass valves to the gas expansion turbine (bypass valves) must open in the case of an emergency switchoff so quickly that they allow the total amount of waste gas to flow through.

The differential pressure that becomes established over the bypass valves must be exactly equal to the differential pressure that acted before the emergency switchoff over the expansion turbine, taking additionally into account the throttling action of the inlet valves.

Pressure regulations of gas expansion turbines which comprise a regulation of regenerator outlet pressures in FCC (Fluid Catalytic Cracking) plants have been known.

Three valves are moved in the "split range" in this pressure regulation. As the output signal of the process pressure regulator increases, a valve is first opened at the inlet of the expansion turbine. Once this is fully open, a small bypass valve begins to open. Once this small valve is fully open as well, a large valve opens, so that all three valves are open at full output signal of the process pressure regulator.

A large (second) bypass valve and a small (first) bypass valve are used because the volume flows can be better regulated with a small valve than with one large valve. Only a small partial amount is usually controlled in the bypass. This small amount can be better regulated with a small valve than with a large one.

Each of the three valves is additionally energized by safety controls. These safety controls act independently from the regulation and move the corresponding valve into a predetermined, safe end position when a control responds. This is the closed position for the inlet valve of the expansion turbine, and the open position for the first or second bypass valve.

If a load shedding of the generator or another change in load occurs, the inlet valve of the expansion turbine, which is controlled by the safety control, is closed. The pressure in the process increases as a consequence. This is recognized by the process pressure regulator and increases its output signal. The first (small) bypass valve opens first via a "split range" control, and the second (large) bypass valve will be opened wide enough for the process pressure to reach its desired value again.

However, this regulation process has the drawback that considerable variations occur in the process pressure. In particular, the pressure increases markedly immediately after the load shedding, before the process pressure regulator can intervene and can stop the increase in pressure by opening the bypass valves.

SUMMARY AND OBJECTS OF THE INVENTION

The primary object of the present invention is to stabilize the regulation of the bypass valves and of the inlet valve of the gas expansion turbine during a sudden load shedding such that the overall system will be linearized even if the characteristics of the regulating valves are nonlinear by a linear relationship being established between the output of the pressure regulator and the flow through the gas expansion turbine or the bypass valves and by the variations in the process pressure during a disturbance being minimized.

According to the invention, a process is provided for regulating the gas pressures of a regenerator operating interconnected with a reactor during the use of at least one gas expansion turbine in the gas line with a generator or with another load, wherein a process regulator opens the inlet valves of a gas expansion turbine and/or the bypass valves or throttles the bypass valves. The process includes recording, as a function of the gas flow, characteristics with correcting variables of the inlet control valves of a gas expansion turbine, of a first bypass valve, of a second bypass valve (valve and of additional valves. This recording of characteristics is done once with the operation of the gas expansion turbine (regulation 1) and once without the operation of the gas expansion turbine (regulation 2). A plurality of function generators are arranged downstream of a said process regulator. These function generators include function generators which preset the correcting variables for the downstream valves as well as function generators which have a first function course stored during the operation of the gas expansion turbine and function generators which have a second function course stored for operation without the gas expansion turbine. The output variables of the function generators which preset the correcting variables for the downstream valves form the set points for position transmitters of the respective downstream valves. A changing over from regulation 1 to regulation 2 takes place via changeover switches in the case of a sudden change in load or in the case of the switching off of the gas expansion turbine.

The present invention is based on the consideration that the stationary end position which the bypass valves must assume is already known at the time of the onset of a sudden load shedding.

This is the position in which the pressure drop over the bypass valves—if throttling chambers are arranged behind the valves, the pressure gradient of these throttling chambers must be taken into account as well—after the load shedding is exactly equal to the pressure gradient over the expander and the inlet valves before the load shedding. The pressure drop in the pipelines may also be significant and must be taken into account.

The regulation behavior can be improved according to the present invention by adding a disturbance variable to the correcting variable of the process regulator at the moment of the load shedding. This jump in the correcting variable brings about a sudden change in the position set points for the bypass valves. As a consequence, the valves themselves move at maximum adjustment velocity to a new working point, from which they are subsequently adjusted further by the process pressure regulator. The value of the jump in the disturbance variable can be determined at the time of the putting into operation of the entire plant.

Even though the undesired increase in pressure can be markedly reduced by the controlled adjustment of the bypass valves, it is disadvantageous that the desired position can be optimized for a single operating point of the plant only, i.e., for a certain amount of waste gas and a certain process pressure. If the plant is operated at another working point, more or less considerable variations in pressure will occur.

A family of characteristics with position values for all valves is therefore additionally plotted according to the present invention as a function of the waste gas flow, doing so once with the gas expansion turbine in operation (regulation 1) and once without operation of the gas expansion turbine (regulation 2).

These characteristics are programmed in the process regulator. The output signal of the process regulator (correcting variable) is sent to the control valves via function generators. The task of these function generators is to linearize the shape of the characteristics. A continuously increased regulator output signal shall lead to a continuously increasing flow. The function generators are programmed such that whenever a valve has reached an end position, the next valve takes over the adjustment. Since characteristics of different shapes are obtained for the two cases of operation, namely, "gas expansion turbine in operation" and "gas expansion turbine out of operation," different function generators are also necessary for the two modes of operation.

In another embodiment, two function generators are associated with each valve, and these function generators additionally assume the function of the split range signal splitting. In another embodiment, the function generators for one mode of operation (operation with gas expansion turbine) may be integrated in a common function generator for all three valves, and those for a second mode of operation, in a second function generator. However, these function generators are to be followed by computing circuits for the split range splitting of the signals in this case.

Since the inlet control valve of the gas expansion turbine is needed in the mode of operation "gas expansion turbine in operation" (regulation 1) only, a single function generator is sufficient here. For example, the function generator controls the inlet control valve in this case with a correcting variable between 0 and 57.8% between the fully closed position and the fully open position. The function generator of the first (small) bypass valve controls this valve with a correcting variable range of 57.8–60.4%, and the function generator of the second (large) bypass valve controls this valve with a correcting variable range of 60.4–100%.

For the case of operation "gas expansion turbine out of operation" (regulation 2), the first (small) bypass valve opens with a correcting variable between 0 and 4.6%, and the second (large) bypass valve opens between 4.6% and 69%. Correcting variables with values more than 69% cannot be operated in this mode of operation, because the corresponding large flows are possible only if the inlet valve additionally opens.

The characteristics programmed in the function generator of the inlet control flap of the gas expansion turbine and in the bypass valves also depend on the pressures occurring in the system and on the volume flow of the waste gases.

A changeover relay, which changes immediately over from one family of characteristics to the other family of characteristics at the time of the onset of a load change, is located according to the present invention in the pipelines of each bypass valve. As a result, each bypass valve receives, immediately at the time of onset of the load shedding, the correcting variable that it would stationarily receive if the expansion turbine had not been in operation. This happens independently from the current waste gas flow, so that an optimal changeover is always guaranteed even in the partial load range or at an overload point.

If the gas expansion turbine is not in operation (regulation 2), the inlet control valve is completely closed via the safety control, and the function generator that comes into action in the case of nonoperation of the gas expansion turbine, i.e., in the case of load shedding of the generator, will be active for the bypass valves.

The action of the process pressure regulator is not compromised in any way by the changeover from one characteristic to the other, because the change in the process pressure or a change in the pressure set point is directly converted by the process pressure regulator into a change in the correcting variable, and this changed correcting variable is then sent directly to the valves via the corresponding function generator.

It should be noted that the "split range" splitting is also performed by these function generators, and no additional means are necessary for this signal splitting.

The families of characteristics may be plotted either experimentally during the putting into operation of the plant, but they may also have been determined before by computer simulation.

These families of characteristics are plotted by continuously increasing the flow through the pipelines, through the expander and through the bypass valves. The ranges of the percentages given above correspond to a percentage mass flow. The mass flow is 100% if all three valves are open, the expander is in operation, and the rated pressure of the plant is maintained. However, this case is feasible only theoretically, because, as was described above, the full amount of waste gas can be passed either via the gas expansion turbine or via the bypass valves.

The calculated total flow (100%) consequently corresponds to nearly 200% of the actually possible flow. However, this flow is definitely feasible in a calculation or in a computer simulation. The family of characteristics is now plotted such that the plant is run stationarily to different working points, and the mass flow belonging to each working point in the pipelines as well as the position of the valves are recorded.

An additional correcting variable can be temporarily sent to the output of the process regulator at the time of the load shedding.

The process according to the present invention does not yet lead to an optimal result no matter how fine the support points are for plotting the characteristics, because the pipeline elements between the bypass valves and the throttling points arranged downstream of them are extensively pressureless with the bypass valves closed or extensively closed, because the flow through the valves as well as through the throttling points is small, as a result of which only a small pressure gradient becomes established over the throttling points. If the bypass valves now open, a higher pressure drop becomes stationarily established over the throttling points because of the larger flow, which also causes the pressure between the valves and the throttling points to be stationarily markedly higher than before.

However, since these pipeline sections represent a gas volume, and an additional mass flow is necessary for increasing the pressure, a larger mass flow must temporarily flow through the valves than through the throttling point. This is not taken into account according to the primary components of the process of the invention. The consequence of this is that the process pressure temporarily and briefly drops below the stationary value in the process according to the present invention, because a larger flow is temporarily taken from the process than in the stationary state.

This drawback can be circumvented by adding an additional disturbance variable, but with a negative sign, to the regulator output at the time of each load shedding. This disturbance variable is such that it causes the bypass valves to not move at first completely to the stationary position, but they will temporarily still remain in a somewhat more throttled position in order to also generate the same pressure gradient in the bypass temporarily as it had previously become established over the gas expansion turbine. The additional correcting variable can be determined by calculation. Another possibility is to dynamically simulate the entire plant in a computer model and to determine, note/store and thereby record the difference between the flow through the throttling points and the flow through the valves during a simulated load shedding.

The difference of these two mass flows corresponds to the necessary correcting variable.

The mass flow difference may be plotted, e.g., over time at 0.1-sec intervals and be stored in the regulator as a function course. If there are flow-measuring points in the plant at the corresponding measurement locations, the correcting variable may also be determined by measurement at the time of a load shedding.

The inlet valves close in the case of a sudden change in the load of the expansion turbine, especially in the case of a switchoff. The bypass valves open according to the present invention wide enough to be able to allow the total amount of flue gas to flow through.

If the system is now to be returned into the original state, the changeover relays of the bypass valves switch back again to the function generators which are for the operation with gas expander. However, based on the programmed function courses, the function generators for operation without gas expander generate higher signals than do the function generators for operation with gas expander. The consequence of this is a jump of the bypass valves into the closed position. To avoid this jump, the correcting variable of the process regulator is changed at the moment of the changeover in a controlled manner by exactly such an amount that the output of the function generators for operation with gas expander after the changeover corresponds to the output of the function generators for operation with gas expander after the changeover. It is ensured as a result that the position of the bypass valves is not influenced by the changeover. The changeover takes place smoothly.

The gas expander or the gas expansion turbine is again ready for a start after this changeover. The inlet control valve is first fully opened by a controlled intervention. The gas expansion turbine is subsequently started by slowly opening the quick-acting valve. Unacceptable changes in speed are avoided by the intervention of the speed regulator. The opening of the quick-acting valve affects the process gas pressure slightly; this effect is compensated by the process regulator, which closes the bypass valves by the necessary amount.

The start-up process is completed when the generator is synchronized and the inlet and quick-acting valve s are fully opened.

Larger changes in load or even switchoff of the gas expansion turbine may also take place during the start-up process. It is desirable to minimize the reactions to the process in this mode of operation as well.

This may be achieved by attenuating the input variables to the function generators for operation without gas expander as a function of the position of the quick-acting valve or as a function of the desired position of this valve (output of the speed regulator). If the quick-acting valve is fully opened, the input signals are not attenuated; if the quick-acting valve is fully closed, the input signals are attenuated such that the changeover relays of the first and second bypass valves generate the same output signal before and after the changeover. If the inlet valve assumes an intermediate position, a partial attenuation takes place.

In another embodiment of the present invention, the pressure directly before the bypass valves or the gas expansion turbine, rather than the process pressure, is continuously regulated immediately with the load shedding (regulation 2), because the expander inlet valves are the starting point of the disturbance. The disturbance in the process thus propagates from this point into the process. If the disturbance in the process is detected sooner, still before it becomes noticeably active in the process itself, the regulating behavior can be markedly improved. This is done by sending to the regulator the difference between the pressure at the branch point of the pipeline and the set point for this pressure, rather than the difference between the set point of the process pressure and the actual process pressure. The set point for the pressure in the branch point of the pipelines is selected to be the pressure prevailing at that pressure release point immediately before the load shedding.

The switching back to the normal process pressure regulation may take place according to various criteria, which will be described below.

The switching back from "regulation of the pressure before the gas expansion turbine" to process pressure regulation may take place as a function of the time such that a changeover to process regulation is performed at a certain, preset time after the load shedding.

The switching back from "regulation of the pressure in the inlet of the gas expansion turbine" to process regulation takes place as a function of a preset time and additionally depending on the fact that the current correcting variable of the bypass valve that is in operation corresponds to the mean value of the correcting variable over a predetermined, past period of time.

The variations in the process pressure are minimal if the regulators, namely, both the regulator for the inlet pressure into the gas expansion turbine and the regulator for the process pressure, are operated with the greatest possible sensitivity.

However, this may cause the valves to not assume their stationary end positions immediately, but a "damped transient effect" begins. This means that the correcting variable first overshoots the stationary value, then it undershoots the stationary value due to a regulator intervention, to subsequently exceed the stationary value again, etc.

If the changeover of the inlet pressure regulation of the expansion turbines to process regulation takes place in a time-controlled manner only, there is a risk that a changeover takes place precisely when the correcting variable has reached the upper or lower extreme value or is close to this extreme value. The consequence of this is that a relatively great deviation must be eliminated by the process pressure regulator after the switching back to process pressure regulation. However, this leads to needlessly great changes in the process pressure itself, so that they should be avoided as much as possible. This is remedied by the above-described method, namely, by switching back to process pressure regulation only when the current correcting variable exactly corresponds to the mean value over a past period of time. It is thus ensured that the position of the valves at the time of the changeover is much closer to the new, stationary end value than it otherwise is.

The same goal is also accomplished when the changeover takes place at the point at which the correcting variable is subject to the greatest change.

The changeover from one regulator to the other may take place in various ways. One possibility is to provide two separate regulators, namely, the differential pressure regulator or process regulator, and a pressure regulator. Each of these two regulators controls an output signal, and the changeover relay of the first bypass valve sends only one of these two signals to the next function generator. The output of the other regulator remains inactive.

Such an arrangement involves the risk that the output of the inactive regulator receives a signal different from that received by the active regulator. A jump would occur at the time of changeover. To avoid this, the inactive regulator is adjusted to the output of the active regulator, i.e., the output of the inactive regulator is always compulsorily adjusted to the output value of the active regulator. Jumps at the time of changeover are avoided as a result.

Another possibility of avoiding jumps at the time of a changeover is to use only one, common regulator. Two regulating differences are formed; the difference from the differential pressure set point and the differential pressure actual value, on the one hand, and the difference from the set point and the actual value of the pressure before the bypass valve s, on the other hand. Both regulating differences are sent to a relay, which sends one regulating difference or the other to the common regulator, depending on the desired mode of operation, and maintains the actually desired process variable at a constant value.

The changes in the process pressure at the time of load shedding can also be reduced by increasing the proportional sensitivity of the active process regulator after a load shedding. The consequence of this is that even though the control circuit may possibly become unstable, so that the above-described variations in the correcting variable around the new stationary point will occur, this offers the advantage that the correcting variables reach the vicinity of the new stationary end value much more rapidly.

Switching back to the normal proportional sensitivity may be performed in the same manner as was described above.

Variable sensitivity may be selected for both the process pressure regulation and the regulation of the inlet pressure of the expansion turbine.

The above-described regulation processes are also applicable when changeover is performed between any two operating states from regulation 1 to regulation 2. Thus, the case of "gas expansion turbine out of operation" is a special case only.

One exemplary embodiment of the present invention will be explained on the basis of a control circuit of a catalytic cracking plant with a gas expansion turbine with generator arranged in the waste gas flow.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a schematic diagram of a control circuit of a catalytic cracking plant with a gas expansion turbine with generator arranged in the waste gas flow.

DETAILED DESCRIPTION OF THE PREFERRED EMBODIMENT

Referring to the only drawing in particular, the invention comprises a process for regulating the gas pressures of a regenerator operating interconnected with a reactor during the use of at least one gas expansion turbine in the gas line with a generator or with another load. In the example, a catalyst is continuously circulated between a reactor 1 and a regenerator 2 in a catalytic cracking plant. Deposited carbon is burned off from the catalyst in the regenerator 2 by supplying combustion air. Reactivated catalyst from the regenerator 2 is mixed with charge and is returned to the reactor 1.

After leaving the regenerator 2 and passing through a dust separator 31, the hot flue gas in the flue gas line A 3 can be expanded in a double slide valve 13 and a throttling chamber 14 and be sent to the main flue via a waste heat boiler 15. This mode of operation continues to be possible even after the installation of a gas expansion turbine 7. The double slide valve 13 is controlled via a pressure regulator 32.

After the installation of the gas expansion turbine 7, the hot flue gas can be passed via the flue gas line B 4 instead of through the double slide valve 13 and the throttling chamber 14 of the flue gas line A 3. The power extracted from the flue gas is converted into effective electric power in a generator 7.1. The waste gas of the gas expansion turbine 7 is also fed to the waste heat boiler 15 and is discharged into the atmosphere via the main flue.

In normal operation, the flue gas flows through the gas expansion turbine 7, and electric power is generated. Parts of the flue gas are bypassed through throttling valve 11, 12 via the waste heat boiler 15 and to the flue in the case of load shedding. Two control 8 and quick-acting valves 9 are arranged for this purpose one behind the other in the flue gas line B 4 before the gas expansion turbine 7, and a first bypass valve 11 and a second bypass valve 12 are arranged in the bypass C 5.

An expansion of the regulation system is also necessary due to the inclusion of a gas expansion turbine 7, because the main flue gas flow about 95% is passed through the gas expansion turbine 7 instead of through the double slide valve 13. The differential pressure between the reactor 1 and the regenerator 2 shall not be unacceptably disturbed at the time of the start or switching off of the gas expansion turbine 7.

Furthermore, additional components are added to the existing regulation system, in addition to the above-mentioned four control valves 8, 9, 11, 12:

A process regulator 17 and a pressure regulator 18, which act on the inlet control flap 8 and the two bypass valves 11 and 12 in split range.

A speed regulator 10 for synchronizing the expander/generator system 7, 7.1 with the electric power line. The same regulator 10 is used to move the quick-acting flap 9 into the fully opened or closed position.

All valves 8, 9, 11, 12 are equipped with position transmitters 19, 20, 21, 22 for exact positioning, as well as with actuating drives 20.2, 21.2 for quick opening of the bypass valves 11 and 12, as well as with activating drives 19.2, 22.2 for quick closure of the inlet valves 8 and 9.

The valve 9 is acted upon by the speed regulator 10 and is engaged only at the time of the start-up of the expansion turbine 7 until the synchronization of the generator 7.1. The valve 9 is then moved into the fully open position.

The process regulator 17 is engaged in normal operation in the case of regulation 1. The control valve 9 and the quick-acting inlet valve 8 are fully open. The second large bypass valve 12 is fully closed, and the first small bypass valve 11 regulates the differential pressure. About 95% of the [total] amount of flue gas flows through the expander 7, which operates at its rated operating point, and about 5% flows through the bypass valve 11. Variations in the flue gas by not more than 3% of the rated flow are detected by the process regulator 17 and are eliminated by adjusting the first bypass valve 11. The second bypass valve 12 is fully closed during the normal operation, but it additionally opens when a large amount of flue gas is suddenly available. Likewise, the first bypass valve 11 and the inlet control valve 8 partially close if a small amount of flue gas is available.

The amount of gas leaking through the first bypass valve 11 is sufficient to keep the hot gas lines 5, 6 warm. If necessary, an adjustment may be made by setting the minimal opening on the position regulator 20.1 or 21.1.

The characteristics of the setting values of the input and output variables for the inlet control valves 8, the first bypass valve 11, and the second bypass valve 12, which are stored in the function generators 23–27, are sent to the position regulators 20.1 and 21.1 via changeover switches 28, 29. The position regulator 20.1 regulates the position of the first bypass valve 11, and the position regulator 21.1 regulates the position of the second bypass valve 12.

In the case of operation with gas expansion turbine 7 expander, the function generator 23 acts directly on the setting valves 19–19.2 of the inlet control valve 8, and the function generators 24 and 26 act on the setting valves 20–20.2 of the first bypass 11 as well as on the setting valves 21–21.2 of the second bypass 12.

In the case of regulation 2 operation without gas expansion turbine, the function generators 25 and 27 act on the setting valves 20–20.2 of the first bypass 11 as well as on the setting valves 21–21.2 of the second bypass 12. The actuating drives 19–19.2 of the inlet valve 8 are not affected, and the inlet control valve s 8 and 9 remain closed, and the actuating drives 22–22.2 of the quick-acting valve 9 are acted on via the speed regulators 10 of the gas expansion turbine 7.

A changeover regulator 30, which transmits the signals of the pressure regulator 18 to the function generators 23–27 in the case of load changes or other irregularities during the regulation of the pressure, is inserted between the process regulator 17 and the function generators 23–27.

A measuring transducer 33 each, which converts the differential pressure $\Delta P$ into an electric signal, is provided before the process regulator 17 and the pressure regulator 32 of the double slide valve 13.

While a specific embodiment of the invention has been shown and described in detail to illustrate the application of the principles of the invention, it will be understood that the invention may be embodied otherwise without departing from such principles.

APPENDIX
List of Reference Numbers:

| | |
|---|---|
| 1 | Reactor |
| 2 | Regenerator |
| 3 | Flue gas line A |
| 4 | Flue gas line B |
| 5 | Bypass line C |
| 6 | Bypass line D |
| 7 | Gas expansion turbine/expander |
| 7.1 | Generator |
| 8 | Inlet control valve |
| 9 | Quick-acting valve |
| 10 | Speed regulator |
| 11 | First bypass valve |
| 12 | Second bypass valve |
| 13 | Double slide valve |
| 14 | Throttling chamber in A |

-continued

APPENDIX
List of Reference Numbers:

| | |
|---|---|
| 15 | Waste heat boiler |
| 16 | Throttling chamber in C |
| 17 | Differential pressure regulator/Process regulator |
| 18 | Pressure regulator in the inlet of 7 |
| 19 | Position transmitter of 8 |
| 19.1 | Position regulator |
| 19.2 | Actuating drive |
| 20 | Position transmitter of 11 |
| 20.1 | Position regulator |
| 20.2 | Actuating drive |
| 21 | Position transmitter of 12 |
| 21.1 | Position regulator |
| 21.2 | Actuating drive |
| 22 | Position transmitter of 9 |
| 22.1 | Position regulator |
| 22.2 | Actuating drive |
| 23 | Function generator inlet control valve 8 |
| 24 | Function generator of first bypass valve for operation with gas expansion turbine |
| 25 | Function generator first bypass valve for operation without gas expansion turbine |
| 26 | Function generator second bypass valve for operation with gas expansion turbine |
| 27 | Function generator for operation without gas expansion turbine |
| 28 | Changeover relay first bypass valve |
| 29 | Changeover relay second bypass valve |
| 30 | Changeover regulator |
| 31 | Dust separator |
| 32 | Pressure regulator of 13 |
| 33 | Measuring transducer |

What is claimed is:

1. A process for regulating the gas pressures of a regenerator operating interconnected with a reactor, comprising the steps of providing at least one gas expansion turbine in a gas line with a load;
   providing a process regulator which opens inlet control valves of a gas expansion turbine and first and second bypass valves;
   recording correcting variables of the inlet control valves of the gas expansion turbine, recording correcting variables of a first bypass valve, recording correcting variables of a second bypass valve, said correcting variables being recorded as a function of a control signal to a respective gas flow, once during a first regulation procedure with operation of the gas expansion turbine and once during a second regulation procedure without operation of the gas expansion turbine;
   providing a plurality of function generators which preset the correcting variables for the inlet control valves as well as the bypass valves with a regulator signal, in which a first set of said plurality of function generators is used during said first regulation procedure and in which a second set of said plurality of function generators is used for said second regulation procedure, said plurality of function generators being connected following the process regulator;
   providing a valve position transmitter for at least one of said inlet control valves and for said first bypass valve and said second bypass valve;
   forming set points for said position transmitters for output variables of said plurality of function generators for the valve position transmitters; and
   changing over from said first regulation procedure to said second regulation procedure via changeover switches in the case of a sudden change in load or in the case of the switching off of the gas expansion turbine.

2. The process in accordance with claim 1, wherein in the case of switching back from said first regulation procedure to said second regulation procedure with the inlet control valves closed, the output of the process regulator performs such a correcting variable jump that the position of the bypass valves remains unchanged.

3. The process in accordance with claim 1, wherein in a case of a changeover from said first regulation procedure to said second regulation procedure with one said inlet valves partially closed, a correcting variable, which is a function of the position of one of the partially throttled inlet valves, is subtracted from the input of the function generators.

4. The process in accordance with claim 1, wherein a correcting variable, which is formed from the difference of the mass flows between the inlet of a bypass line and the outlet of the bypass line, is temporarily sent to the process regulator after a change in load of the gas expansion turbine.

5. The process in accordance with claim 1, wherein a pressure regulator is provided for regulating one of the pressure of the process and the regulating the pressure directly before one of the bypass valves of the gas expansion turbine and the inlet valves and no longer regulates the process and regulates the pressure directly before the one of the bypass valves of the gas expansion turbine and the inlet valve substantially immediately with the change in the load of the gas expansion turbine.

6. The process in accordance with claim 5, wherein two separate regulators are used to regulate the process pressure and the pressure directly before the bypass valves of the gas expansion turbine and a regulator that is not in operation is adjusted to the output of the said active regulator.

7. The process in accordance with claim 5, wherein only one common regulator is used for regulating the process pressure and the pressure directly before the bypass valves, and that a regulating difference that can be changed over is sent to the one common regulator.

8. The process in accordance with claim 5, wherein a switching back of the regulation of the pressure before said one of the bypass valves and said inlet valve of the gas expansion turbine to the regulation of the process pressure takes place in a time-dependent manner such that a changeover to process pressure regulation will again be performed after a preset time beginning from the change in the load of the gas expansion turbine.

9. The process in accordance with claim 5, wherein a switching back of the regulation of the pressure before the one of said bypass valves and the inlet valve of the gas expansion turbine to the regulation of process pressure regulation takes place depending on a preset time and additionally depending on whether the current correcting variable of the first bypass valve that is in operation or of the second bypass valve corresponds to the mean value of the correcting variable over a predefined past period of time.

10. The process in accordance with claim 5, wherein a switching back of the regulation of the pressure before the one of said bypass valves and the inlet valve of said gas expansion turbine to the process pressure regulation takes place at the point at which one of the correcting variable for the first bypass valve that is in operation and the said second bypass valve is subjected to the greatest change.

11. The process in accordance with claims 5, wherein the measurement of the pressure before the bypass valves by the pressure regulator takes place either at a junction of a flue gas line and a gas turbine flue gas line branch or in the gas turbine flue gas line branch or in a bypass line.

12. The process in accordance with claim 5, wherein a proportional sensitivity of the active process regulator is increased after a change in the load of the gas expansion turbine.

13. A process for regulating gas pressures in accordance with claim 1, wherein one of a disturbance variable and a disturbance variable jump is added to the correcting variable of the process regulator for regulating one of the pressure of the process and of the pressure regulator, for regulating the pressure directly before one of the bypass valves of the gas expansion turbine and the inlet valve at the moment of the load change, and said one of said disturbance variable and said disturbance variable jump is transmitted to the function generators of the inlet valve and of the bypass valves.

14. The process for regulating gas pressures in accordance with claim 13, wherein the value of the disturbance variable jump in the case of a sudden load shedding of the gas turbine, which is transmitted to the position transmitters, is determined during the putting into operation of the gas turbine, of the inlet control valves and of said bypass valves.

15. A process for regulating the gas pressures of a system including a regenerator operating interconnected with a reactor, the process comprising the steps of:

providing a flue gas line and a flue gas branch line;

providing at least one gas expansion turbine connected to the flue gas branch line, said turbine being connected to a load;

providing an inlet control valve in the flue gas branch line;

providing a flue gas bypass line with a bypass valve;

providing a process regulator for detecting pressure and for opening and/or throttling the inlet control valve and/or bypass valve;

recording correcting variables of the inlet control valve and recording correcting variables of the bypass valve, said correcting variables being a relationship between a control signal sent to a respective said valve and an actual gas flow through said respective valve, once during a first regulation procedure with operation of the gas expansion turbine and once during a second regulation procedure without operation of the gas expansion turbine;

providing a plurality of function generators which preset the correcting variables for the inlet control valve as well as the bypass valve with a regulator signal, in which a first set of said plurality of function generators is stored during said first regulation procedure and in which a second set of said plurality of function generators is stored for said second regulation procedure, said plurality of function generators being connected for conditioning an output of said process regulator;

providing a valve position transmitter for said inlet control valve and for said bypass valve;

forming set points for said position transmitters for output variables of said plurality of function generators for the valve position transmitters; and changing over from said first regulation procedure to said second regulation procedure via changeover switches during a switching off of the gas expansion turbine.

16. The process in accordance with claim 15, wherein in the case of switching back from said first regulation procedure to said second regulation procedure with the inlet control valve closed, the output of the process regulator performs such a correcting variable jump that the position of the bypass valve remains unchanged.

17. The process in accordance with claim 15, wherein said process regulator includes a process pressure regulator for regulating the process pressure in said flue gas line and a turbine/bypass pressure regulator for regulating the pressure directly before one of the bypass valve of the gas expansion turbine and the inlet valve and said process pressure regulator is disabled and said turbine/bypass regulator only functions substantially immediately with the change in the load of the gas expansion turbine.

18. The process in accordance with claim 17, wherein said process regulator includes two separate regulators used to regulate the process pressure and the pressure directly before the bypass valves of the gas expansion turbine and a regulator that is not in operation is adjusted to the output of the said active regulator.

19. The process in accordance with claim 17, wherein said process pressure regulator and said turbine/bypass pressure regulator together are provided with only one common regulator used for regulating the process pressure and the pressure directly before the bypass valves, and that a regulating difference that can be changed over is sent to the one common regulator.

20. The process in accordance with claim 17, wherein a switching back of the regulation of the pressure before one of the bypass valve and the inlet valve of the gas expansion turbine to the regulation of the process pressure takes place in a time-dependent manner such that a changeover to process pressure regulation will again be performed after a preset time beginning from the change in the load of the gas expansion turbine.

21. Process in accordance with claim 5, wherein: two separate controllers and control process pressure and pressure occurring directly before said bypass valves of said gas expansion turbine, and the one said controller that is not being engaged is adjusted to the output of an active said controller.

22. Process in accordance with claim 5, wherein: one common controller is used for controlling process pressure and pressure directly before said bypass valves, and that a reversible control difference is admitted to said controller.

23. Process in accordance with claim 1, wherein: when switching back from operation without said gas expansion turbine to operation with said gas expansion turbine with said inlet valves closed, an output of position transmitters performs a jump in a controller output that the position of said bypass valves remains unchanged.

24. Process in accordance with claim 1, wherein: in a switch-over from operation with said gas expansion turbine to operation without gas expansion turbine with said inlet valves partially closed, a correcting variable, which is a function of the position of said inlet valve or of the output of said inlet valve, is subtracted from the input of said resolver transmitters.

25. A process for regulating the gas pressures of a system with a regenerator interconnected with a reactor, the process comprising the steps of:

providing a flue gas line providing a flue gas branch line connected to said flue gas line;

providing at least one gas expansion turbine connected to the flue gas branch line, said turbine being connected to a load;

providing an inlet valve in the flue gas branch line;

providing a flue gas bypass line connected to said flue gas line;

providing a bypass valve in said bypass line;

measuring a pressure in said flue gas line;

controlling said inlet control valve and said bypass valve to maintain a desired pressure in said flue gas line, said controlling including:

generating a regulator output signal dependent on said measured pressure and said desired pressure;

converting said regulator output signal into a first inlet valve signal and a first bypass valve signal for maintaining said measured pressure substantially equal to said desired pressure with said turbine operating;

converting said regulator output signal into a second bypass valve signal for maintaining said measured pressure substantially equal to said desired pressure with said turbine not operating;

sending said first inlet valve signal to said inlet valve and sending said first bypass valve signal to said bypass valve when said turbine is operating;

sending said second bypass valve signal to said bypass valve when said turbine is not operating.

* * * * *